United States Patent
Giannopoulos

(10) Patent No.: US 10,484,425 B2
(45) Date of Patent: Nov. 19, 2019

(54) CONTROLLER AREA NETWORK FRAME OVERRIDE

(71) Applicant: The MITRE Corporation, McLean, VA (US)

(72) Inventor: Hristos N. Giannopoulos, Woburn, MA (US)

(73) Assignee: The MITRE Corporation, McLean, VA (US)

( * ) Notice: Subject to any disclaimer, the term of this patent is extended or adjusted under 35 U.S.C. 154(b) by 170 days.

(21) Appl. No.: 15/719,071

(22) Filed: Sep. 28, 2017

(65) Prior Publication Data

US 2019/0098047 A1   Mar. 28, 2019

(51) Int. Cl.
*H04L 29/06* (2006.01)
*H03M 13/09* (2006.01)
*G06F 13/42* (2006.01)

(52) U.S. Cl.
CPC ...... *H04L 63/1483* (2013.01); *G06F 13/4282* (2013.01); *H03M 13/09* (2013.01)

(58) Field of Classification Search
CPC . H04L 63/1483; G06F 13/4282; H03M 13/09
See application file for complete search history.

(56) References Cited

U.S. PATENT DOCUMENTS

| | | | |
|---|---|---|---|
| 9,311,762 | B2 | 4/2016 | Godley |
| 9,401,923 | B2 | 7/2016 | Valasek et al. |
| 2003/0084384 | A1 * | 5/2003 | White, III ............... H04L 1/08 714/704 |
| 2014/0047255 | A1 | 2/2014 | Sasaki et al. |
| 2014/0165191 | A1 | 6/2014 | Ahn et al. |
| 2014/0195808 | A1 | 7/2014 | Lortz et al. |
| 2015/0020152 | A1 | 1/2015 | Litichever et al. |

(Continued)

FOREIGN PATENT DOCUMENTS

| | | | | |
|---|---|---|---|---|
| WO | WO-2013144962 | A1 * | 10/2013 | ............. H04L 63/14 |
| WO | 2015081969 | A1 | 6/2015 | |
| WO | 2016091439 | A1 | 6/2016 | |
| WO | 2016151566 | A1 | 9/2016 | |

OTHER PUBLICATIONS

Kammerer, Roland et al. (2012) "Enhancing Security in CAN Systems using a Star Coupling Router," IEEE retrieved from www.vmars.tuwien.ac.at/documents/extern/3116/canrouter_security.pdf; 10 pages.

(Continued)

*Primary Examiner* — Jeffrey C Pwu
*Assistant Examiner* — William A Corum, Jr.
(74) *Attorney, Agent, or Firm* — Morrison & Foerster LLP

(57) ABSTRACT

The present disclosure relates to suppressing malicious transmissions by overriding frames on a Controller Area Network (CAN) bus. In an embodiment, a method operates by determining when a frame arrives at a CAN bus. A determination of whether to override the frame is made based on an arbitration ID of the frame received from the CAN bus. In response to determining to override the frame, a predetermined sequence of bits is transmitted on the CAN bus during transmission of a data length code (DLC) field in the frame. A message to complete the frame is generated based on the predetermined sequence of bits. Then, the message is transmitted on the CAN bus.

21 Claims, 7 Drawing Sheets

(56) References Cited

U.S. PATENT DOCUMENTS

| | | |
|---|---|---|
| 2015/0066239 A1 | 3/2015 | Mabuchi |
| 2015/0172306 A1 | 6/2015 | Kim et al. |
| 2015/0191136 A1 | 7/2015 | Ben Noon et al. |
| 2015/0195297 A1* | 7/2015 | Ben Noon ............ B60R 16/023 726/22 |
| 2015/0347218 A1* | 12/2015 | Domingues ........... H04L 1/0061 714/57 |
| 2015/0348346 A1 | 12/2015 | Morselli |
| 2016/0188396 A1 | 6/2016 | Sonalker et al. |
| 2016/0188876 A1 | 6/2016 | Harris et al. |
| 2016/0189056 A1 | 6/2016 | Mayhew |
| 2016/0197944 A1 | 7/2016 | Allouche et al. |
| 2016/0212162 A1 | 7/2016 | Cain et al. |
| 2016/0219028 A1 | 7/2016 | Baltes et al. |
| 2016/0286010 A1* | 9/2016 | Lennartsson ........... H04L 69/08 |
| 2016/0359893 A1* | 12/2016 | Kishikawa ........ H04L 12/40013 |
| 2017/0013006 A1* | 1/2017 | Ujiie .................. H04L 12/6418 |
| 2017/0026386 A1* | 1/2017 | Unagami .............. B60R 16/023 |
| 2018/0152472 A1* | 5/2018 | Amano ............ H04L 12/40176 |
| 2018/0189483 A1* | 7/2018 | Litichever ........... H04L 67/2823 |
| 2018/0194323 A1* | 7/2018 | Woodill, Jr. .......... H04W 12/00 |
| 2018/0241584 A1* | 8/2018 | Ruvio ............... H04L 12/40013 |

OTHER PUBLICATIONS

Kim, Dae-Kyoo et al. (2016) "Introducing Attribute-Based Access Control to AUTOSAR," SAE Technical Paper 2016-010069, 2016, retrieved at http://papers.sae.org/2016-01-0069/, SAE 2016 World Congress and Exhibition, Abstract only; 1 page.

Otsuka, Satoshi et al. (2014) "CAN Security: Cost-Effective Intrusion Detection for Real-Time Control Systems," retrieved at http://papers.sae.org/2014-01-0340, SAE 2014 World Congress & Exhibition, Abstract only; 1 page.

Talebi, Sareh (2014) "A Security Evaluation and Internal Penetration Testing of the CAN-bus," Chalmers University of Technology, retrieved from http://publications.lib.chalmers.se/records/fulltext/212488/212488.pdf; 95 pages.

Ujiie, Y. et al. (2016) "A Method for Disabling Malicious CAN Messages by Using a CMI-ECU 2016-01-0068," retrieved at http://papers, sae.org/2016-01-0068/, SAE 2016 World Congress and Exhibition, Abstract only; 1 page.

Yoshida, Junko (2016) "CAN Bus Can Be Encrypted, Says Trillium," EE|Times, retrieved from http://www.eetimes.com/document.asp?doc_id=1328081; 5 pages.

* cited by examiner

CONTROLLER AREA NETWORK FRAME OVERRIDE

FIELD

The present disclosure relates generally to the Controller Area Network (CAN) standard and more specifically to overriding frames on a CAN bus.

BACKGROUND

Automobiles today are monitored and controlled by many Electronic Control Units (ECUs) that communicate with each other in an in-vehicle communication system. Before the most widely used automotive bus standard, Controller Area Network (CAN), emerged, wiring between ECUs were point to point, which resulted in complex and expensive wiring configurations. CAN, which is a broadcast network connecting multiple ECUs, vastly reduced the wiring complexities and provides real-time, high-speed communications between ECUs.

However, the CAN standard lacks provisions for authentication and confidentiality, which allows any ECU connected to a CAN bus to transmit any properly formed CAN message. As a result, a compromised ECU can transmit spoofed and malicious messages on the CAN bus. Moreover, due to the broadcast nature of the CAN bus, a single compromised ECU can simultaneously affect multiple ECUs in the CAN network.

Various schemes have been proposed to introduce cryptographic elements within the CAN message to provide CAN message authentication. One scheme adds a cryptographic Message Authentication Code within a CAN message at the Application layer (layer 7) to allow each ECU to authenticate that CAN message. This approach, however, introduces significant communication overhead onto the CAN bus as the amount of ECU data that each CAN message can transmit is reduced. Another variant of introducing cryptographic elements replaces an error-detecting code, e.g., a cyclic redundancy code (CRC), in a CAN message with a cryptographically Message Authentication Code, e.g., a cryptographic CRC, at the link layer (layer 2) in hardware. While this variant does not introduce significant communication overhead, this variant requires each CAN controller within respective ECUs to be modified because cryptographic CRCs are not implemented in the CAN standard and therefore standard CAN controllers lack the functionality to process such cryptographic CRCs.

SUMMARY

As explained above, the CAN standard lacks provisions for authentication and as a result exposes a CAN network to cyber-attacks such as spoofed messages. Known methods for CAN message authentication introduce cryptographic elements within a CAN message, which either increases communication overhead or requires a complete redesign of hardware elements within the CAN network. Therefore, improved techniques for CAN bus security are needed without the drawbacks mentioned above. Accordingly, disclosed herein are systems and methods for suppressing malicious transmissions by overriding frames on a CAN bus, which do not introduce significant bus overhead or require a complete redesign or upgrade of the CAN network. In fact and in contrast to cryptographic authentication, the disclosed systems and methods introduce no bus overhead under normal operation, i.e., no malicious frames are detected.

In some embodiments, a method to suppress malicious transmissions by overriding frames on a CAN bus comprises: determining when a frame arrives at a CAN bus; receiving, from the CAN bus, an arbitration identification (ID) of the frame; determining whether to override the frame based on the arbitration ID; in response to determining to override the frame, transmitting a predetermined sequence of bits on the CAN bus during transmission of a data length code (DLC) field in the frame; generating a message to complete the frame based on the predetermined sequence of bits; and transmitting the message on the CAN bus.

In some embodiments, a system to suppress malicious transmissions by overriding frames on a Controller Area Network (CAN) bus comprises: one or more processors; memory; and one or more programs, wherein the one or more programs are stored in the memory and configured to be executed by the one or more processors, the one or more programs including instructions for: determining when a frame arrives at a CAN bus; receiving, from the CAN bus, an arbitration identification (ID) of the frame; determining whether to override the frame based on the arbitration ID; in response to determining to override the frame, transmitting a predetermined sequence of bits on the CAN bus during transmission of a data length code (DLC) field in the frame; generating a message to complete the frame based on the predetermined sequence of bits; and transmitting the message on the CAN bus.

DETAILED DESCRIPTION

Figure 1:
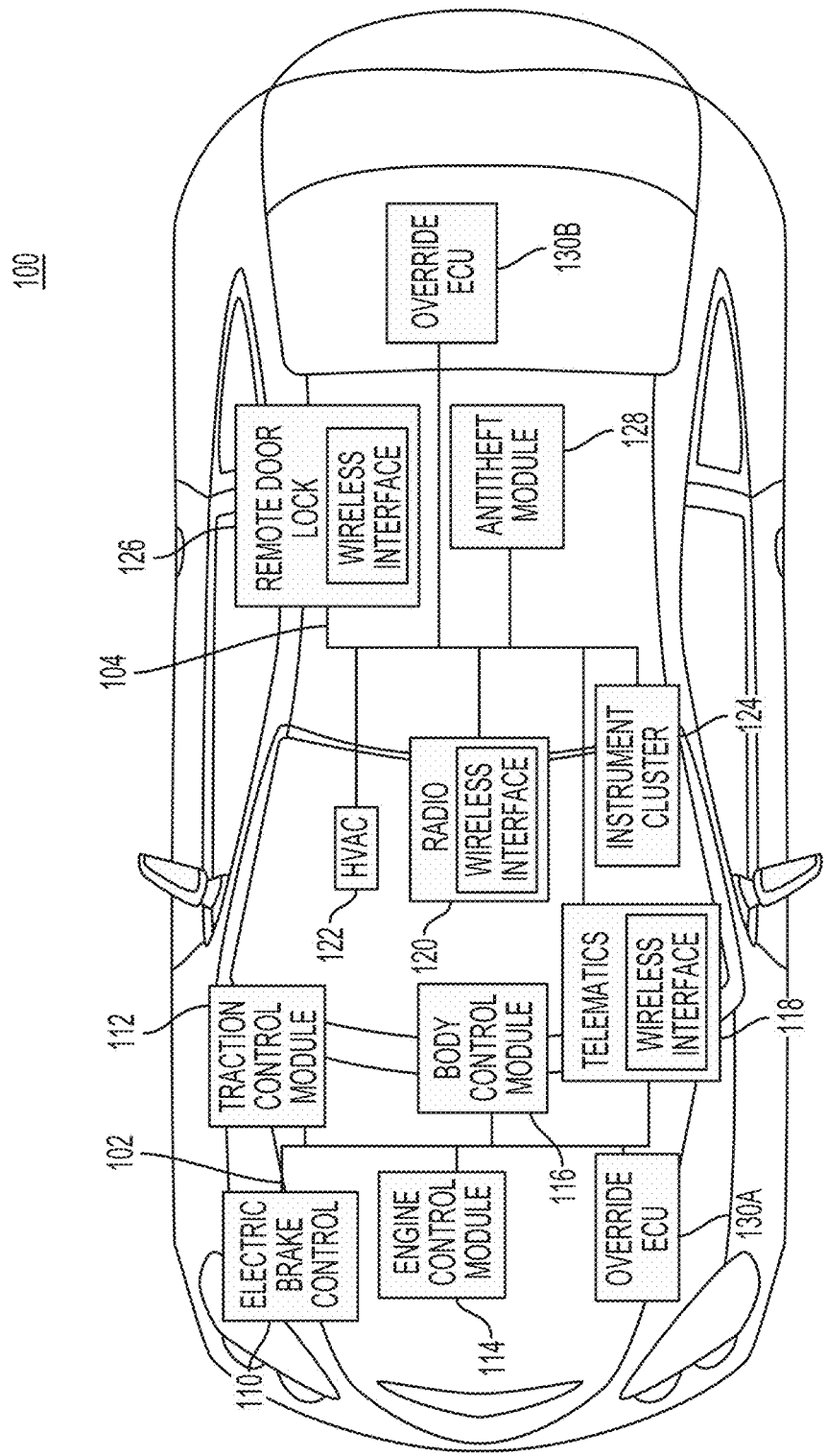
FIG. 1 is a diagram illustrating an exemplary in-vehicle communication system for suppressing malicious transmissions, according to some embodiments.

Embodiments described herein provide techniques for suppressing malicious transmissions on a Controller Area Network (CAN) bus connecting a plurality of Electronic Control Units (ECUs). The CAN protocol is a serial, multi-master communication bus used for real-time applications such as in automotive systems. In some embodiments, the CAN protocol specifies an arbitration process that prevents message transmission conflicts by assigning a message sent by each ECU with a priority specific to that message. Further, the CAN protocol defines how the plurality of ECUs generate and transmit a CAN message (i.e., a frame), detect errors, and contain faults while communicating on the CAN bus. In some embodiments, techniques described herein can suppress malicious transmissions on the CAN bus while complying with the CAN protocol and without modifying how the plurality of ECUs process CAN frames being transmitted on the CAN bus.

In general, a CAN frame may be formed to include a plurality of fields such as an arbitration identification (ID) field, a data length code (DLC) field, a data field, and a cyclic redundancy check (CRC) field among other fields. The arbitration ID field adds priority to messages such that when two or more ECUs attempt to transmit at the same time, the ECU that sends the lowest arbitration ID has a higher priority and will continue to transmit its message while the other ECUs halt transmission. The DLC field provides information about a length of the data payload. The data field can include between 0 and 8 data byes (or more) depending on a format of the CAN frame. The number of bytes of the data field is dictated by the DLC field. The CRC field is included to provide message integrity by calculating a value based on one or more fields that have been transmitted in the frame. For example, the CRC field can be calculated based on the arbitration ID field, the DLC field, and the data field. The CRC value may be calculated using a specific polynomial as commonly implemented in digital networks and as would be known to one of ordinary skill in the art.

In some embodiments, the types of errors detected on the CAN bus may include bit errors, stuff errors, CRC errors, form errors, and acknowledgement errors. Bit errors and acknowledgment errors may be relevant to a first ECU transmitting a CAN frame whereas stuff errors, form errors, and CRC errors may be relevant to a second ECU receiving the CAN frame being transmitted by the first ECU. In some embodiments, stuff errors, form errors, and CRC errors can be detected by any ECU, such as the second ECU, receiving the CAN frame being transmitted by the first ECU.

In some embodiments, once the first ECU wins arbitration (i.e., the CAN frame being transmitted by the first ECU has the highest priority), the first ECU can detect a bit error when a bit value on the CAN bus differs than a bit value being transmitted by the first ECU. Upon transmitting the frame, the first ECU may detect an acknowledgement error if the first ECU receives no acknowledgement from at least one ECU, such as the second ECU, connected to the CAN bus of receipt of the transmitted frame.

In some embodiments, form errors, CRC errors, or stuff errors may be detected by an ECU, such as the second ECU, receiving a CAN frame. The second ECU may detect a form error if the received CAN frame does not adhere to the format of a CAN frame as specified in the CAN protocol. In some embodiments, the second ECU computes a CRC for the frame being received and may detect a CRC error if the computed CRC differs from the CRC received in the CAN frame. In some embodiments, the second ECU detects a stuff error upon receiving a consecutive sequence of a predefined number of equal bits within the frame. For example, in the CAN protocol, a stuff error may be detected if the second ECU receives more than 5 consecutive 0s (e.g., a bit value of "000000") or more than 5 consecutive 1's (i.e., a bit value of "111111"). In normal operation and to enable the ECUs communicating on a CAN bus to stay synchronized, an ECU transmitting a frame may insert an artificial bit of opposite polarity (i.e., a "stuff bit") after transmitting a consecutive sequence of a predefined number of equal bits.

In some embodiments, a method for suppressing malicious transmissions by overriding frames on a CAN bus takes advantage of how errors are detected and processed by ECUs communicating on a CAN bus. The method includes determining when a frame arrives at the CAN bus. Then, an arbitration ID of the frame is received. A determination of whether to override the frame is made based on an arbitration ID of the frame received from the CAN bus. In response to determining to override the frame, a predetermined sequence of bits is transmitted on the CAN bus during transmission of a DLC field in the frame. In some embodiments, the transmission of the predetermined sequence of bits may trigger an error, e.g., a bit error, at the ECU transmitting the frame with the arbitration ID and thereby overriding the frame being transmitted. Further, the method includes generating a message based on the predetermined sequence of bits to complete the frame. Then, the message is transmitted on the CAN bus. In some embodiments, the message can be generated and transmitted by the override ECU to reduce the likelihood that one or more ECUs receiving the frame detect errors.

FIG. 1 is a diagram illustrating an exemplary in-vehicle communication system 100 for suppressing malicious transmissions, according to some embodiments. In the example shown in diagram, in-vehicle communication system 100 includes a plurality of ECUs 110-118 and 120-128 that communicate with each other via a CAN bus 102 or a CAN bus 104. For example, CAN bus 102 may be a high-speed CAN bus that provide a communication network that connects high-impact ECUs such as electronic brake control 110, traction control module 112, engine control module 114, body control module 110, and telematics 118. CAN bus 104 may be a low-speed CAN bus that provides a communication network that connects other, low-impact ECUs that are less likely to impact a driver's safety while operating the vehicle. For example, CAN bus 104 may connect radio 120, HVAC 122 (heating, ventilation, and air conditioning), instrument cluster 124, remote door lock 126, and anti-theft module 128. In some embodiments, some ECUs such as body control module 116 and telematics 118 can be coupled to both CAN bus 102 and CAN bus 104.

Modern vehicles are becoming more susceptible to cyber-attacks as more ECUs are implemented with wireless capabilities. In particular, many ECUs such as telematics 118, radio 120, and remote door lock 126 in today's vehicles implement respective wireless interfaces. For example, telematics 118 may be an ECU that includes a wireless interface for connecting to a mobile network (e.g., Wi-Fi, LTE, 3G, etc.) to retrieve traffic information, weather information, and navigation assistance among other types of data. These ECUs that implement wireless interfaces may be particularly vulnerable to cyber-attacks that enable an attacker to inject malicious messages onto CAN bus 102 or CAN bus 104.

As discussed above, due to the lack of authentication in the in-vehicle communication network, the attacker may spoof one or more messages from one or more ECUs, which may be extremely dangerous for the driver and passengers in the vehicle. For example, the attacker may compromise telematics 118 via a wireless interface that exposes telematics 118 to cyberattacks. After compromising, for example, telematics 118, the attacker may inject a malicious message via telematics 118 to spoof a message as being sent by, for example, electronic brake control 110. This spoofed message may, for example, control the vehicle to brake unexpectedly while being operated by the driver. To increase the security of in-vehicle communication system 100, one or more override ECUs 130A-B can be coupled to one or more in-vehicle communication networks, e.g., CAN bus 102 and CAN bus 104, according to some embodiments. In some embodiments, an override ECU, such as override ECU 130A, can be coupled to multiple in-vehicle communication networks such as CAN buses 102 and 104.

Figure 3:
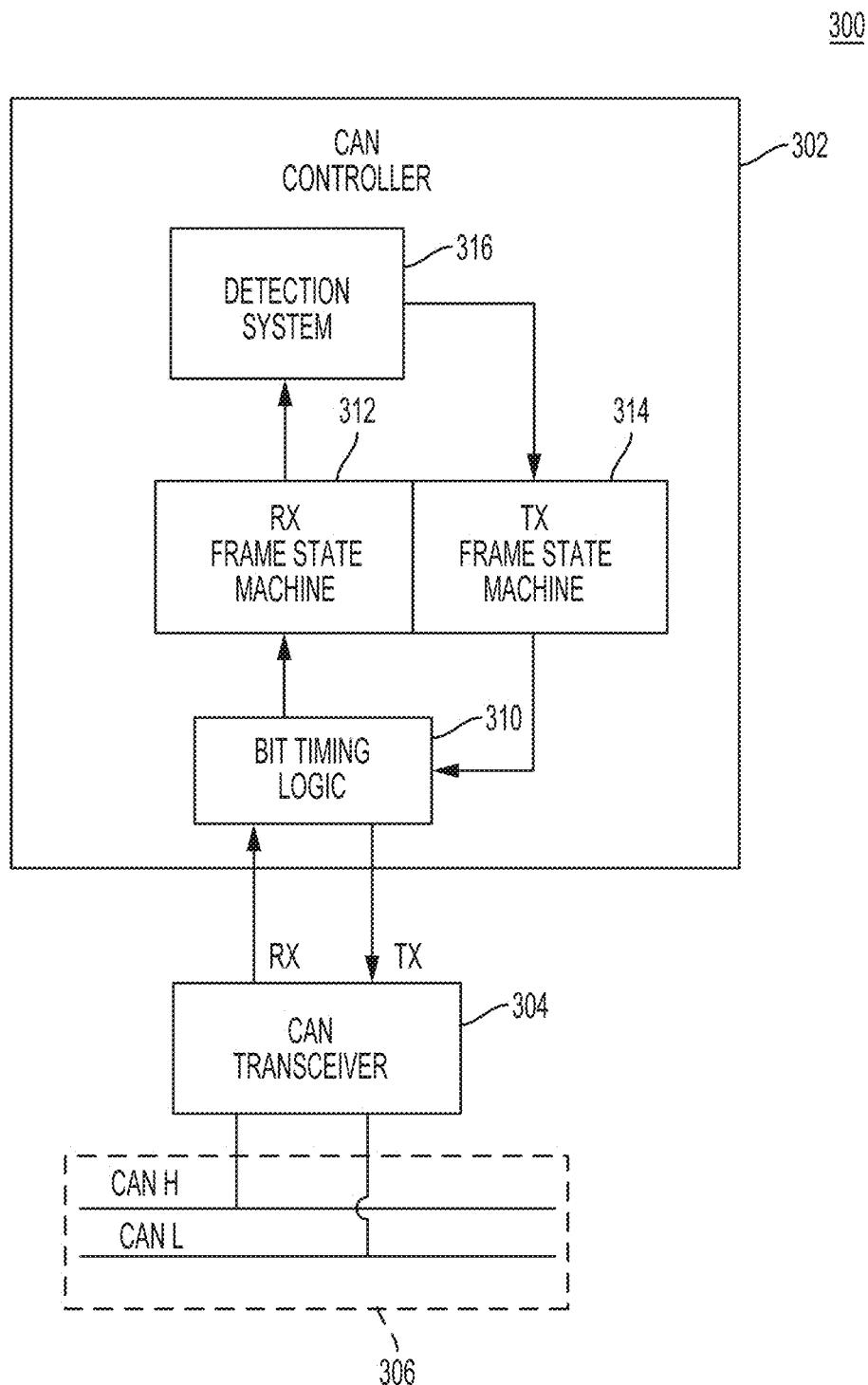
FIG. 3 is a block diagram illustrating exemplary components of an override Electronic Control Unit (ECU) for suppressing malicious transmissions on a CAN bus, according to some embodiments.
Figure 4:
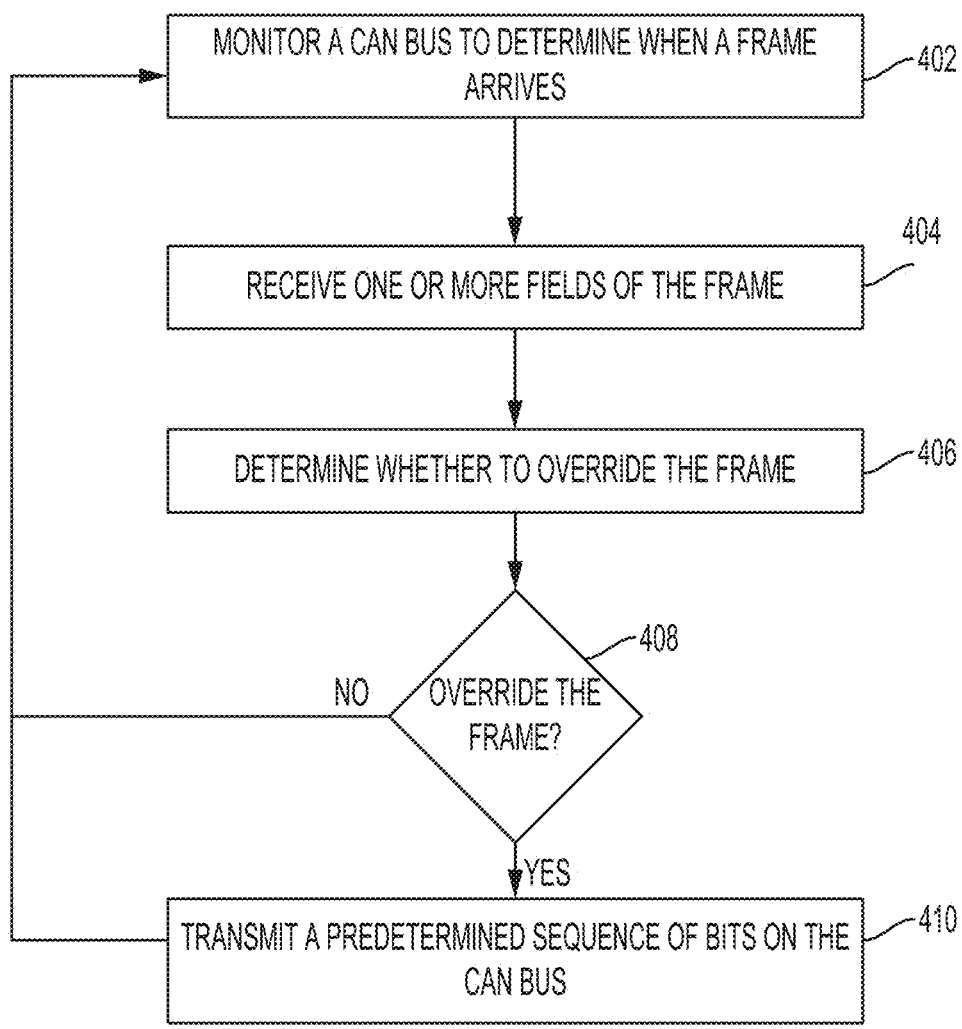
FIG. 4 is a flow diagram illustrating a process for overriding a frame on a CAN bus, according to some embodiments.
Figure 5:
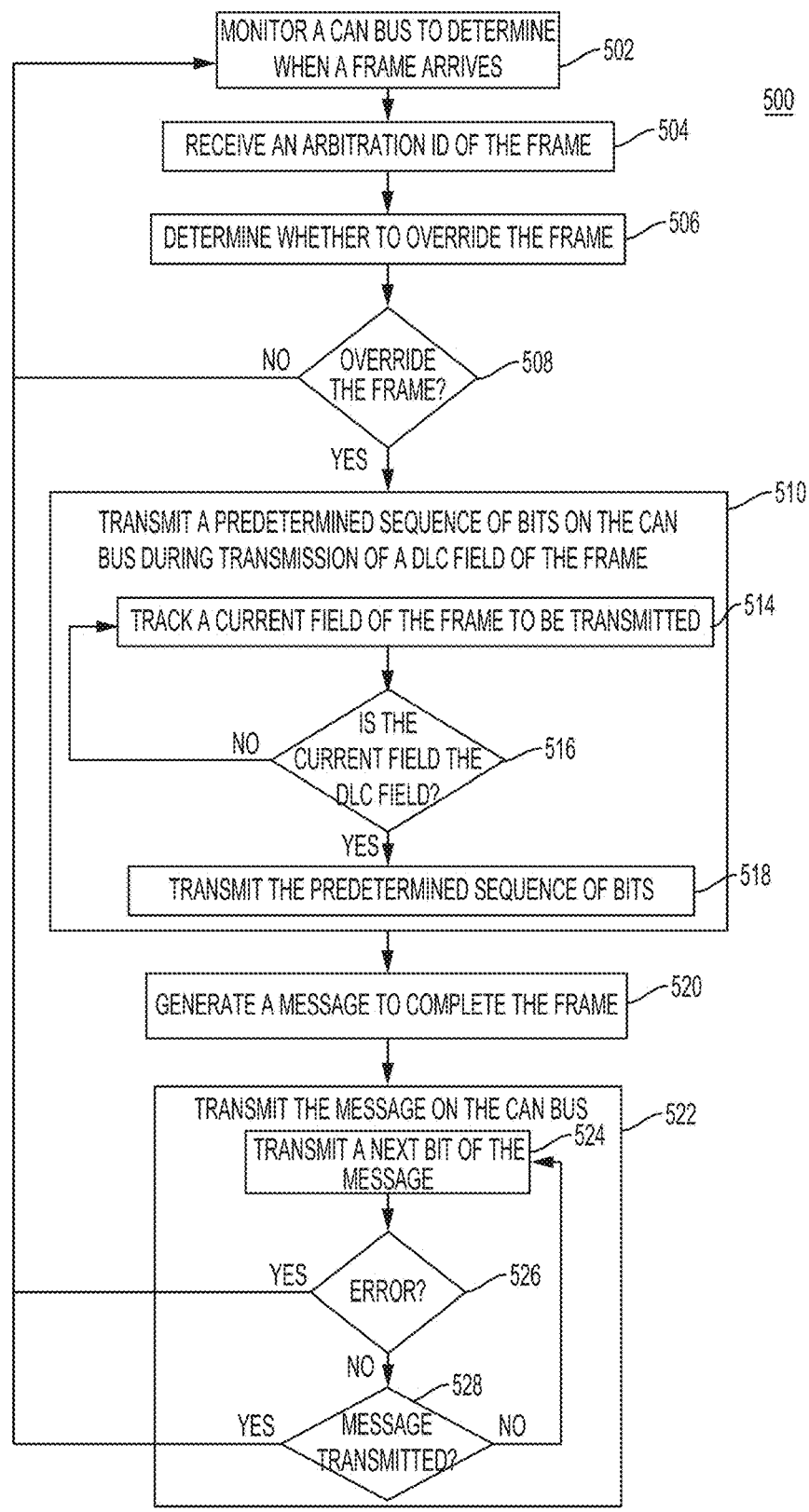
FIG. 5 is a flow diagram illustrating a process for overriding a frame on a CAN bus, according to some embodiments.
Figure 6:
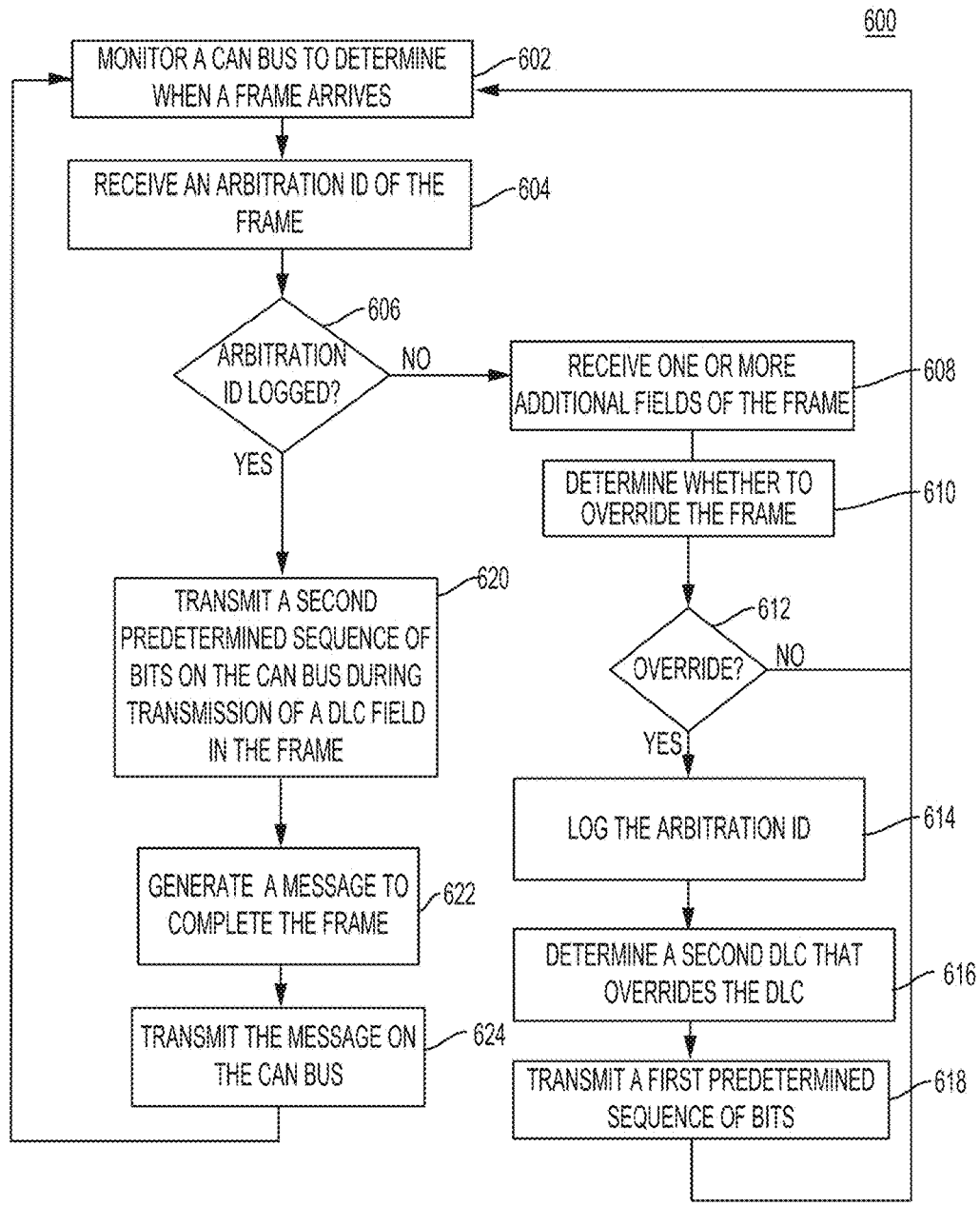
FIG. 6 is a flow diagram illustrating a process for overriding a frame on a CAN bus, according to some embodiments.

In some embodiments, override ECUs 130A and 130B can be customized hardware coupled to a CAN bus (e.g., CAN bus 102 and/or CAN bus 104) to detect and override a malicious frame being transmitted on the CAN bus before the entire malicious frame can be successfully transmitted and received by one or more ECUs coupled to the CAN bus. As will be described below, FIG. 3 shows an example implementation of override ECU 130A. FIGS. 4, 5, and 6 describe respective methods 400, 500, and 600, one or more of which may be implemented by override ECU 130A to suppress malicious transmissions on the CAN bus, according to some embodiments.

In some embodiments, implementing override functionality in separate hardware, such as override ECUs 130A and 130B, reduces the amount of redesign and reconfiguration of an existing in-vehicle communication system as override ECU 130A or ECU 130B can be simply coupled to the CAN bus to provide override functionality. However, in other embodiments, some or all of the functionality of override ECUs 130A and 130B can be implemented within one or more of the other ECUs such as ECUs 110-118 or ECUs 120-128.

Figure 2:
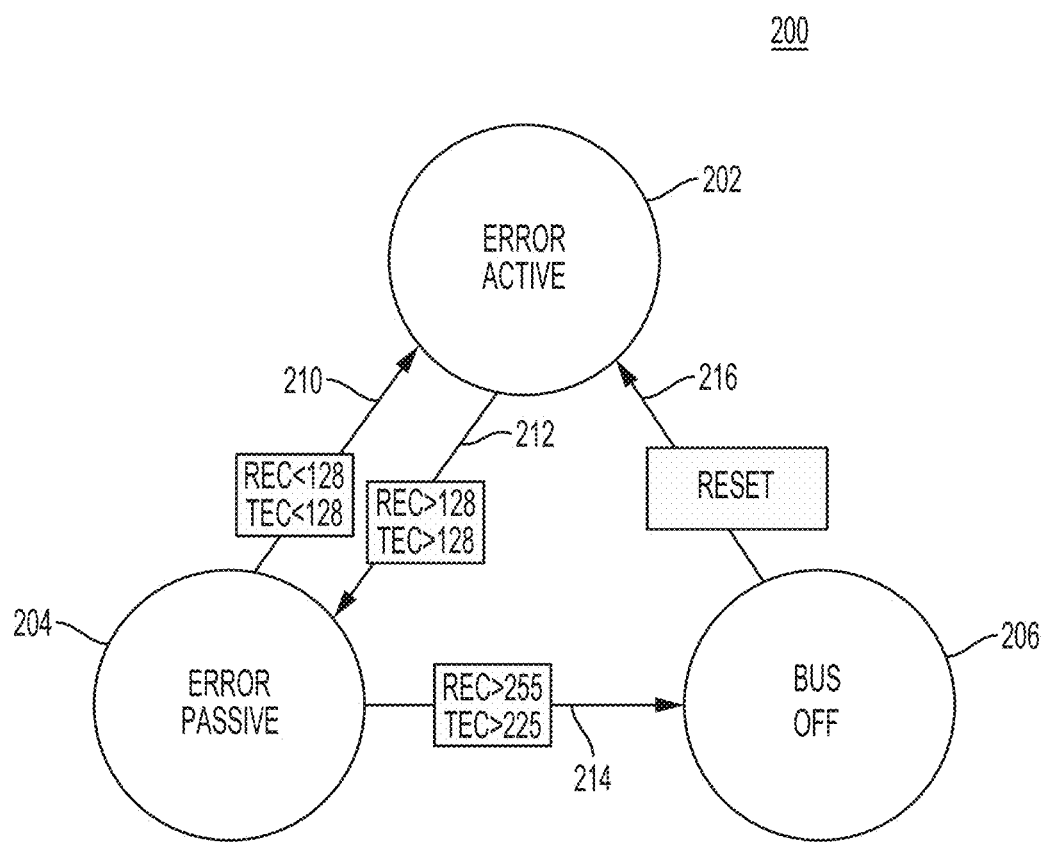
FIG. 2 is a diagram of an exemplary finite-state machine implemented by an ECU to respond to errors detected on a CAN bus, according to some embodiments.

FIG. 2 is a diagram of an exemplary finite-state machine 200 implemented by a CAN controller to respond to errors detected on a CAN bus, according to some embodiments. For example, a CAN controller in an ECU, such as electronic brake control 110 from FIG. 1, may implement the finite-state machine 200. In some embodiments, the CAN controller implements finite-state machine 200 to provide fault containment such that if the ECU malfunctions, the CAN controller eventually disables its own transmissions on the CAN bus so as to not deny or disable one or more other ECUs (and respective CAN controllers) coupled to the CAN bus from transmitting messages. In some embodiments, every ECU within in-vehicle communication system 100 implements respective CAN controller having logic of finite-state machine 200. In some embodiments, an override ECU such as override ECUs 130A and 130B does not include a CAN controller that implements finite-state machine 200 so as to safeguard against being disabled by a malfunctioning or compromised ECU.

In some embodiments, finite-state machine 200 includes three states: error active 202, error passive 204, and bus off 206. In some embodiments, during error active 202 and upon detecting an error, the CAN controller of the ECU can transmit an error flag that triggers an error in one or more ECUs connected to the CAN bus. For example, the error flag may include a consecutive sequence of a predetermined number of dominant bits, e.g., 6 dominant bits. In some embodiments, during error passive 204 and upon detecting an error, the CAN controller can transmit an error flag that does not necessarily trigger an error in the one or more ECUs connected to the CAN bus. For example, the error flag here may include a predetermined number of recessive bits, e.g., 6 recessive bits, that would be overridden by any other transmission on the CAN bus. In some embodiments, during bus off 206, the CAN controller disables itself from transmitting messages on the CAN bus. For example, the CAN controller may prevent the ECU from transmitting any frames on the CAN bus to affect one or more other ECUs receiving the frames. In some embodiments, as described below, an override ECU may continue to override frames (detected as being malicious) being transmitted by the ECU and trigger errors in the ECU such that the CAN controller of the ECU eventually transitions to bus off 206 where the CAN controller prevents frames generated by the ECU from being transmitted on the CAN bus.

As discussed above, errors detected by the CAN controller may include various types such as bit errors, stuff errors, CRC errors, form errors, and acknowledgement errors depending on whether the ECU is transmitting or receiving a CAN frame. In some embodiments, the CAN controller maintains: a receive error count (REC) for errors detected while receiving a CAN frame, and a transmit error count (TEC) for errors detected while transmitting a CAN frame. For example, the CAN controller may implement a RX (receive) register and a TX (transmit) register for storing the REC and TEC, respectively.

In some embodiments, when the CAN controller is transmitting a frame generated by the ECU, the CAN controller increments the TEC by a predefined value, e.g., 8, upon detecting an error before completing transmission of the frame. Upon completing transmission of the frame, the CAN controller may decrement the TEC by a predefined value, e.g., 1. In some embodiments, when the CAN controller is receiving a frame, the CAN controller increments the REC by a predefined value, e.g., 1, upon detecting an error before receiving the complete frame. Upon receiving the complete frame without detecting an error, the CAN controller may decrement the REC by a predefined value, e.g., 1.

In some embodiments, the CAN controller determines whether to transition from one state to another state based on a detected error, the REC, or the TEC. In some embodiments, if a current error state is error active 202, the CAN controller transitions 212 to error passive 204 upon determining that either REC exceeds a first predetermined value, e.g., 128, or TEC exceeds a second predetermined value, e.g., 128. In some embodiments, if a current error state is error passive 204, the CAN controller transitions 214 to bus off 206 upon determining that either REC exceeds a first predetermined value, e.g., 255, or TEC exceeds a second predetermined value, e.g., 255. In some embodiments, upon successfully transmitting and receiving enough frames without detecting an error, the CAN controller transitions from error passive 204 back to error active 202. For example, the CAN controller may transition 210 from error passive 204 to error active 202 upon determining that the REC falls below a first predetermined value, e.g., 128, and that the TEC falls below a second predetermined value, e.g., 128. In some embodiments, if a current error state is bus off 206, the CAN controller may remain in bus off 206 until a reset occurs. As will be understood by a person or ordinary skill in the art, any of the first and second predetermined values described above may be the same or different values.

FIG. 3 is a block diagram illustrating exemplary components of an override ECU 300 for suppressing malicious transmissions on a CAN bus, according to some embodiments. For example, override ECU 300 may be an example implementation of override ECU 130A or 130B as described with respect to FIG. 1. In some embodiments, override ECU 300 includes a CAN transceiver 304 and a CAN controller 302.

In some embodiments, CAN transceiver 304 interfaces with a CAN bus 306 to enable CAN controller 302 to communicate with other ECUs coupled to CAN bus 306. As shown in FIG. 3, CAN bus 306 may include two open collector lines, CAN High and CAN low, according to some embodiments. The two lines may correspond to two states: a recessive state corresponding to a first logic value (e.g., logic 1), and a recessive state corresponding to a different, second logic value (e.g., logic 0).

In some embodiments, CAN transceiver 304 detects voltage values of the two lines in CAN bus 306 to determine whether a first or second logic value is being transmitted at CAN bus 306. For example, CAN transceiver 304 may detect that the first logic value is being transmitted upon determining that both lines idle at half system voltage and that the second logic value is being transmitted upon determining that the CAN High line is pulled to VCC and the CAN Low line is pulled to ground. In some embodiments, CAN transceiver 304 transmits the first or second logic values on CAN bus 306 by controlling voltage values of the two lines in CAN bus 306 as discussed above. In some embodiments, due to the collector nature of CAN bus 306, a dominant state overrides a recessive state.

In some embodiments, CAN controller 302 includes detection system 316, RX frame state machine 312, TX frame state machine 314, and bit timing logic 310 to suppress malicious transmissions by overriding frames on CAN bus 306. In some embodiments, CAN controller 302 can be implemented using a general purpose microprocessor, a standard computer, a digital signal processor (DSP), application-specific integrated circuit (ASIC), or field-programmable gate array (FPGA).

In some embodiments, bit timing logic 310 implements synchronization logic to allow CAN controller 302 to process bits received (RX) from CAN transceiver 304 and to transmit (TX) bits to CAN transceiver 304.

In some embodiments, RX frame state machine 312 monitors bits received from CAN bus 306 via CAN transceiver 304 to determine when a frame arrives at the CAN bus. In some embodiments, RX frame state machine 312 implements logic for receiving one or more fields of the frame. While receiving the frame, RX frame state machine 312 may track a current field, a next field, or a combination thereof, according to some embodiments. In some embodiments, logic implemented by RX frame state machine 312 includes bit stuffing logic to "unstuff" the frame being received. In some embodiments, while receiving the frame, RX frame state machine 312 computes a CRC value.

In some embodiments, detection system 316 receives one or more fields of the frame from RX frame state machine 312 to determine whether to override the frame, as will be further described with respect to FIGS. 4-6. In some embodiments, receiving an arbitration ID of the frame indicates that one ECU has won arbitration and that overriding the frame prevents that ECU from continuing transmission of the frame. In some embodiments, upon determining to override the frame, detection system 316 transmits an override signal to TX frame state machine 314.

In some embodiments, detection system 316 determines whether to override based on whether the received arbitration ID can be found in a plurality of black-listed arbitration IDs. For example, where CAN bus 306 is implemented within a vehicle, the plurality of black-listed arbitration IDs may be associated with diagnostic communications that should not be present on CAN bus 306 during normal operations, e.g., while the vehicle is being driven. In some embodiments, detection system 316 determines whether to override based on the arbitration ID and one or more statuses of a system, e.g., a vehicle, housing override ECU 300, as will be described with respect to FIG. 4.

In some embodiments, as depicted in FIG. 3, detection system 316 may be a component implemented within CAN controller 302. In other embodiments, detection system 316 may be implemented within a processor (e.g., a microprocessor) coupled to CAN controller 302. In some embodiments, detection system 316 can be implemented within one or more processors external to and coupled to override ECU 300. In these embodiments, override ECU 300 can receive, from detection system 316, an external signal instructing override ECU 300 to override one or more frames based on specific criteria, e.g., a specific arbitration ID.

In some embodiments, TX frame state machine 314 transmits bits onto CAN bus 306 based on communications received from detection system 316, as will be further described with respect to FIGS. 4-6. For example upon receiving an override signal from detection system 316, TX frame state machine 314 may be configured to transmitting a predetermined sequence of bits on the CAN bus via CAN transceiver 304. In some embodiments, TX frame state machine 314 transmits the predetermined sequence during transmission of a predefined field of the frame such as the DLC field. In some embodiments, the predetermined sequence of bits may be a predetermined number of consecutive dominant bits such as a bit value of "000000." In some embodiments, to determine when the DLC field is being transmitted, TX frame state machine 314 shares logic implemented by RX frame state machine 312 for tracking a current field, a next field, or a combination thereof. In other embodiments, TX frame state machine 314 receives the current field or the next field from RX frame state machine 312.

In some embodiments, as described with respect to FIGS. 5-6, TX frame state machine 314 generates a message to complete the frame based on the predetermined sequence of bits. For example, the generated message may include a CRC value calculated by logic of RX frame state machine 312 and TX frame state machine 314. In some embodiments, TX frame state machine 314 includes bit stuffing logic to ensure that the message being generated for transmission on CAN bus 306 adheres to the CAN protocol so as to not trigger bit stuffing errors on one or more ECUs receiving the message. In some embodiments, the message may instead by generated by detection system 316.

FIG. 4 is a flowchart illustrating a method 400 to suppress malicious transmissions by overriding frames on a CAN bus, according to some embodiments. Method 400 may be implemented by an ECU such as override ECU 130A in FIG. 1 or override ECU 300 in FIG. 3. In some embodiments, method 400 can be implemented in one or more ECUs coupled to a CAN bus. For example, in in-vehicle communication system 100, method 400 may be implemented within an ECU such as body control module 116 and override ECU 130A.

In step 402, an override ECU monitors the CAN bus to determine when a frame arrives at the CAN bus. For example, the override ECU may detect a start-of-frame field being transmitted on the CAN bus to determine that the frame has arrived.

In step 404, the override ECU receives one or more fields of the frame being transmitted on the CAN bus. For example, the override ECU may receive an arbitration identification (ID), a data length code (DCL), a data payload, a cyclic redundancy check (CRC), or a combination thereof.

In step 406, the override ECU determines whether to override the frame based on the one or more received fields. In some embodiments, the override ECU determines whether to override the frame before receiving an end-of-frame (EOF) of the frame. In other embodiments, the override ECU determines whether to override the frame before receiving the CRC of the frame. For example, the override ECU may determine whether to override the frame after receiving: the arbitration ID; both the arbitration ID and the DLC; or the arbitration ID, the DLC, and the data payload. In some embodiments, this determination may be performed by a detection system such as detection system 316 described with respect to FIG. 3. As shown in FIG. 3, detection system 316 may be a component of the override ECU. In some embodiments, detection system 316 can be implemented within a separate ECU. In these embodiments, the override ECU can determine whether to override the frame based on a result generated by the separate ECU and indicating whether the frame is associated with malicious transmissions.

In some embodiments, the override ECU determines whether to override the frame based on the received arbitration ID. According to some embodiments, the override ECU determines that the frame should be overridden if the arbitration ID is associated with a plurality of blacklisted IDs. For example, the blacklisted IDs may be associated with diagnostic communications. In some embodiments, the override ECU determines that the frame should be overridden if the arbitration ID is not associated with a plurality of whitelisted IDs. In some embodiments, the override ECU determines whether to override the frame based on the arbitration ID and one or more other fields received in step 404. For example, override ECU may determine to override the frame if, according to a set of rules, the data payload includes data that is should not be sent with the arbitration ID.

In some embodiments, the override ECU receives a plurality of statuses of a vehicle housing the CAN bus. The plurality of statuses may include data gathered by sensors within the vehicle. For example, the plurality of statuses may include a speed of the vehicle, an engine temperature, fuel data, etc. In these embodiments, the override ECU determines whether to override the frame based on the arbitration ID and whether the plurality of statuses matches a plurality of criteria associated with the arbitration ID. For example, the override ECU may determine to override a frame having an arbitration ID associated with a blacklisted ID and the speed of the vehicle, an example status, is above 0 mph.

In step 408, if the override ECU determines that the frame should be overridden, method 400 proceeds to step 410. Otherwise, method 400 proceeds to step 402 where the override ECU returns to monitoring the CAN bus to determine when a next frame is being transmitted.

In step 410, the override ECU transmits a predetermined sequence of bits on the CAN bus to trigger an error on the CAN bus. For example, a CAN transceiver (in the override ECU) may transmit the predetermined sequence of bits retrieved by a CAN controller in the override ECU. In some embodiments, the predetermined sequence of bits includes a predetermined number of consecutive dominant bits. For example, the predetermined sequence of bits may include six bits of logical 0, which is a dominant bit value in the CAN protocol. In some embodiments, the predetermined sequence of bits includes six consecutive dominant bits followed by eight consecutive recessive bits. Upon transmission of the predetermined sequence of bits, method 400 returns to step 402 where the override ECU continues to monitor the CAN bus to determine when a next frame arrives on the CAN bus. In effect, the override ECU does not disrupt the transmission of a frame on the CAN bus if no malicious transmissions are detected.

In some embodiments, transmitting the predetermined sequence of bits on the CAN bus triggers an error in each other ECU connected to the CAN bus. Therefore, by transmitting the predetermined sequence of bits, the override ECU overrides the frame being transmitted by another ECU. Upon triggering the error, each of the ECUs connected to the bus generate respective errors. As described with respect to FIG. 2, each ECU may increment their respective error counters. In the example of the CAN protocol, the ECU transmitting the frame of step 502 may increment its error counter by a value of 8 whereas one or more ECUs receiving the frame may increment their respective error counters by a value of 1. In some embodiments, the override ECU does not increment any error counters.

FIG. 5 is a flowchart illustrating a method 500 to suppress malicious transmissions by overriding frames on a CAN bus, according to some embodiments. Method 500 may be implemented by an ECU such as override ECU 130A in FIG. 1 or override ECU 300 in FIG. 3. In some embodiments, method 500 can be implemented in one or more ECUs coupled to a CAN bus. In contrast to method 400, method 500 reduces the number of errors being triggered on the CAN bus. As described below, steps 502-508 may correspond to steps 402-408 as described with respect to method 400.

In step 502, an override ECU monitors the CAN bus to determine when a frame arrives at the CAN bus. In step 504, the override receives an arbitration ID of the frame being transmitted on the CAN bus. As described with respect to FIGS. 1 and 4, the arbitration ID is a field of the frame, according to some embodiments. In step 506, the override ECU determines whether to override the frame based on the arbitration ID. In some embodiments, as described with respect to step 406 of FIG. 4, the override ECU determines whether to override the frame based on the arbitration ID and one or more other fields of the frame or one or more statuses of a vehicle housing the CAN bus. In some embodiments, the override ECU determines whether to override the frame before receiving a CRC of the frame.

In step 508, method 500 proceeds to step 510 if the override ECU determines to override the frame. Otherwise, method 500 returns to step 502 where the override ECU continues to monitor the CAN bus to determine when a next frame is being transmitted. In effect, the override ECU does not disrupt the transmission of a frame on the CAN bus if no malicious transmissions are detected.

In step 510, the override ECU transmits a predetermined sequence of bits on the CAN bus during transmission of a DLC field of the frame. In some embodiments, the predetermined sequence of bits includes a predetermined number of consecutive dominant bits. According to some embodiments, the predetermined number may correspond to the number of bits of the DLC field. For example, in a CAN protocol, a dominant bit is a logical 0 and the DLC field includes 4 bits. In this example, the predetermined number of consecutive dominant bits may be 4 bits of a logical 0 value, i.e., a bit value of "0000." In some embodiments, for a hacked ECU to impart damage on the CAN bus, the hacked ECU would transmit a frame having a malicious data payload, which would require the DLC field indicate a non-zero value. In the CAN protocol, the non-zero value may include at least a recessive bit representing a logical 1. Therefore, because a logical 0 is a dominant bit and a logical 1 is a recessive bit, the override ECU transmitting a bit value of "0000" and representing a zero-byte data payload may override the frame with a non-zero DLC field currently being transmitted by the hacked ECU.

In some embodiments, step 510 includes steps 514-518. In step 514, the override ECU tracks a current field of the frame to be transmitted on the CAN bus. For example, as described with respect to FIG. 3, RX frame state machine 312 receives bits of the frame and tracks a current field of the frame being transmitted on the CAN bus. Based on the current field being transmitted, the override ECU tracks a next field of the frame to be transmitted.

In step 516, the override ECU determines whether the current field is the DLC field. Method 500 proceeds to step 518 if the current field is the DLC field. Otherwise, method 500 returns to step 514 where the next field continues to be tracked.

In step 518, the override ECU transmits the predetermined sequence of bits during transmission of the DLC field of the frame. In some embodiments, the override ECU retrieves the predetermined sequence of bits from a memory. For example, as described with respect to FIG. 3, TX frame state machine 314 may transmit the predetermined sequence of bits.

In step 520, the override ECU generates a message to complete the frame based on the predetermined sequence of bits transmitted in step 510. In some embodiments, the message can be generated based on the arbitration ID received in step 504 and the predetermined sequence of bits transmitted in the DLC field of the frame. For example, the message may include a CRC that the override ECU calculates based on the arbitration ID and the predetermined sequence of bits to validate the frame. In some embodiments, the override ECU generates the message by retrieving a pre-stored message associated with the arbitration ID and the predetermined sequence of bits.

In step 522, the override ECU transmits the message on the CAN bus. In contrast to method 400 where an error is triggered in step 410, the override ECU as described with respect to method 500 generates and transmits a message that reduces the chance of triggering an error on the CAN bus. In some embodiments, by reducing errors on the CAN bus while overriding frames, the override ECU enables the other ECUs connected to the CAN bus to operate more efficiently because these other ECUs expend less computation resources processing and recovering from errors.

In some embodiments, depending on a current error state of the hacked ECU corresponding to the arbitration ID of step 504, the hacked ECU may generate an active error or a passive error. As described with respect to FIG. 2, an ECU in the error active state may transmit an active error to trigger an error in each ECU connected to the CAN bus and the ECU in the passive error state may be configured to transmit a passive error that does not affect CAN bus traffic. Accordingly, depending on the current error state of the hacked ECU, the override ECU may cause the hacked ECU to transmit an active error. In some embodiments, steps 524-528 may be implemented by the override ECU to handle any active errors generated by the hacked ECU.

In step 524, the override ECU transmits a next bit of the message generated in step 520. In step 526, the override ECU determines whether an error occurs on the CAN bus. For example, the override ECU may receive an active error transmitted by the hacked ECU. In some embodiments, the override ECU determines whether the error occurs by comparing the transmitted bit of step 524 with the bit being propagated on the CAN bus. A difference between the transmitted bit and the bit being propagated on the CAN bus indicates an error, according to some embodiments. If an error is detected, method 500 proceeds to step 502 where the override ECU returns to monitoring the CAN bus to determine when a next frame arrives. Otherwise, method 500 proceeds to step 528.

In step 528, the override ECU determines whether the message of step 520 has been transmitted. If not, method 500 proceeds to step 524 where the override ECU transmits the next, un-transmitted bit of the message. If the complete message has been transmitted successfully without triggering an error on the CAN bus, method 500 proceeds to step 502 where the override ECU returns to monitoring the CAN bus to determine when a next frame arrives.

FIG. 6 is a flowchart illustrating a method 600 to suppress malicious transmissions by overriding frames on a CAN bus, according to some embodiments. Method 600 may be implemented by an ECU such as override ECU 130A in FIG. 1 or override ECU 300 in FIG. 3. In some embodiments, method 600 can be implemented in one or more ECUs coupled to a CAN bus. For example, in in-vehicle communication system 100, method 600 may be implemented within an ECU such as body control module 116 and override ECU 130A. In some embodiments, method 600 may provide a similar benefit as method 500 by reducing the number of errors being triggered on the CAN bus while suppressing malicious transmissions. As described below, one or more steps of method 600 may correspond to steps of method 400 and 500 as described with respect to FIGS. 4 and 5, respectively.

In step 602, an override ECU monitors the CAN bus to determine when a frame arrives at the CAN bus. In some embodiments, step 602 corresponds to steps 402 and 502 as described with respect to FIGS. 4 and 5, respectively.

In step 604, the override ECU receives an arbitration ID of the frame. In some embodiments, step 604 corresponds to step 504 as described with respect to FIG. 5.

In step 606, the override ECU determines whether the arbitration ID is logged. If the arbitration is logged, method 600 proceeds to step 608. Otherwise, method 600 proceeds to step 620. In some embodiments, the override ECU determines whether one message from a plurality of logged messages includes the arbitration ID.

In step 608, the override ECU receives one or more additional fields of the frame. For example, in addition to receiving the arbitration ID field of the frame in step 604, the override ECU may receive a data length code (DCL), a data payload, a cyclic redundancy check (CRC), or a combination thereof. In some embodiments, the one or more additional fields include at least the DLC field.

In step 610, the override ECU determines whether to override the frame based on the arbitration ID received in step 604 and the one or more additional fields received in step 608. In some embodiments and similar to step 406 as described with respect to FIG. 6, the override ECU may determine whether to override the frame based on a plurality of statuses monitored by a vehicle housing the CAN bus. In step 612, if the override ECU determines to override the frame, method 600 proceeds to step 614. Otherwise, method 600 returns to step 602 where the override ECU continues to monitor the CAN bus to determine when a next frame arrives.

In step 614, the override ECU logs the arbitration ID as being associated with malicious transmissions. In some embodiments, the override ECU logs the one or more additional fields received in step 608. For example, the override ECU may log the DLC and data payload fields of the frame. In some embodiments, the override ECU logs one or more fields of the frame including the arbitration ID as part of the same message being received.

In step 616, the override ECU determines a second DLC that overrides the DLC received in step 608. In some embodiments, step 616 includes determine whether the DLC includes one or more recessive bit. Upon determining that the DLC includes one or more recessive bit, the override ECU may generate the second DLC by flipping at least one of the recessive bits of the DLC to a dominant bit. In some embodiments, the override ECU may store the generated second DLC in a memory. Memory may include, for example, hardware registers, latches, ROM, RAM, EEPROM, flash memory, etc.

In step 618, the override ECU transmits a first predetermined sequence of bits to override the frame. In some embodiments, step 618 corresponds to step 410 as described with respect to FIG. 4. For example, the first predetermined sequence of bits may include a predetermined number, e.g., six, of consecutive dominant bits. In some embodiments, method 600 returns to step 602 where the override ECU monitors the CAN bus to determine when a next frame arrives.

Returning to step 608, if the arbitration ID received in step 604 is logged, then method 600 proceeds to step 620. For example, the arbitration ID of the frame may have been logged in step 614 in a previous iteration of method 600.

In step 620, the override ECU transmits a second predetermined sequence of bits on the CAN bus during transmission of a DLC field in the frame. In some embodiments, step 620 corresponds to step 510 as described with respect to FIG. 5. For example, the second predetermined sequence of bits may be a predetermined number of consecutive dominant bits such as a bit value of "0000." In some embodiments, the second predetermined sequence of bits corresponds to the second DLC as determined in step 616 during a previous iteration of method 600. In these embodiments, the override ECU may retrieve the second predetermined sequence from a memory storing the second DLC.

In step 622, the override ECU generates a message to complete the frame. In some embodiments, step 622 corresponds to step 520 as described with respect to FIG. 5. In some embodiments, the override ECU generates the message based on the arbitration ID and the second predetermined sequence of bits. For example, the message may include a CRC calculated based on the arbitration ID and the second predetermined sequence of bits.

In some embodiments where the second predetermined sequence of bits is the second DLC, the override ECU may generate a data payload to include in the message. The data payload may have a number of bytes corresponding to the value indicated by the second DLC. In some embodiments, the data payload can be a pre-stored message retrieved by the override ECU based on the arbitration ID and the second DLC.

In step 624, the override ECU transmits the message on the CAN bus. In some embodiments, step 624 may correspond to step 522 as described with respect to FIG. 5. For example, the override ECU may not successfully transmit each bit of the message generated in step 622 if an error is detected on the CAN bus. As described with respect to step 526, the error may be detected if a bit of the message transmitted by the override ECU does not match a bit detected on the CAN bus by the override ECU.

Figure 7:
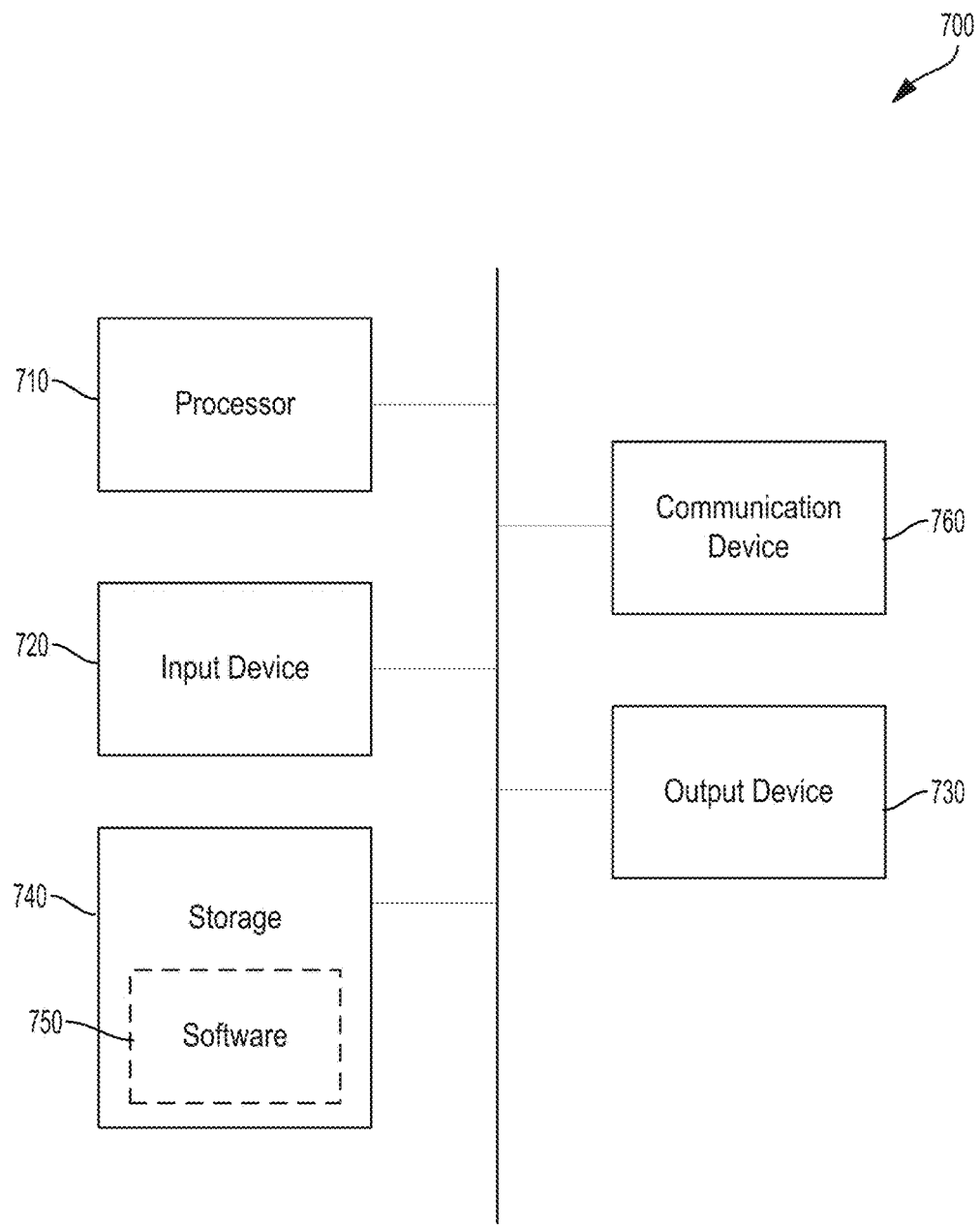
FIG. 7 is a functional block diagram of a computer in accordance with some embodiments.

FIG. 7 illustrates an example of a computer in accordance with one embodiment. Computer 700 can be a component of a system for suppressing malicious transmissions on a CAN bus according to the systems and methods described above or can include the entire system itself. For example, computer 700 may implement some or all of the functionality of override ECUs 130A or 130B as described with respect to FIG. 1 or some or all of the functionality of detection system 316 as described with respect to FIG. 3. In some embodiments, computer 700 is configured to execute a method for suppressing malicious transmissions on a CAN bus, such as each of methods 400, 500, and 600 of FIGS. 4, 5, and 6, respectively.

Computer 700 can be a host computer connected to a network. Computer 700 can be a client computer or a server. As shown in FIG. 7, computer 700 can be any suitable type of microprocessor-based device, such as a personal computer, workstation, server, videogame console, or handheld computing device, such as a phone or tablet. The computer can include, for example, one or more of processor 710, input device 720, output device 730, storage 740, and communication device 760. Input device 720 and output device 730 can generally correspond to those described above and can either be connectable or integrated with the computer.

Input device 720 can be any suitable device that provides input, such as a touch screen or monitor, keyboard, mouse, or voice-recognition device. Output device 730 can be any suitable device that provides output, such as a touch screen, monitor, printer, disk drive, or speaker.

Storage 740 can be any suitable device that provides storage, such as an electrical, magnetic, or optical memory, including a RAM, cache, hard drive, CD-ROM drive, tape drive, or removable storage disk. Communication device 760 can include any suitable device capable of transmitting and receiving signals over a network, such as a network interface chip or card. The components of the computer can be connected in any suitable manner, such as via a physical bus or wirelessly. Storage 740 can be a non-transitory computer-readable storage medium comprising one or more programs, which, when executed by one or more processors, such as processor 710, cause the one or more processors to execute methods described herein, such as each of methods 400, 500, and 600 of FIGS. 4, 5, and 6, respectively.

Software 750, which can be stored in storage 740 and executed by processor 710, can include, for example, the programming that embodies the functionality of the present disclosure (e.g., as embodied in the systems, computers, servers, and/or devices as described above). In some embodiments, software 750 can be implemented and executed on a combination of servers such as application servers and database servers.

Software 750, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description sets forth exemplary methods, systems, techniques, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description may use terms first, second, etc. to describe various elements, these elements should not be limited by the terms. These terms are only used to distinguish one element from another. For example, a first ECU could be termed a second ECU, and, similarly, a second ECU could be termed a first ECU, without departing from the scope of the various described embodiments.

In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer readable storage medium stores one or more programs configured to be executed by one or more processors of an electronic device, the one or more programs including instructions for implementing any of the steps described or claimed herein. The present disclosure also relates to a device for performing the operations herein. This device may be specially constructed for the required purposes (e.g., an application specific integrated circuit (ASIC)), or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

In some embodiments, a system includes one or more integrated circuits configured to execute a method for suppressing malicious transmissions on a CAN bus, such as each of methods 400, 500, and 600 of FIGS. 4, 5, and 6, respectively. In some embodiments, the one or more integrated circuits can be a component of a system for suppressing malicious transmissions on a CAN bus as described above. In some embodiments, the one or more integrated circuits can be a field-programmable gate array (FPGA). As would be understood by a skilled artisan, an FPGA may include a plurality of configurable logic elements and a plurality of configurable storage elements. In some embodiments, configurable logic elements can include, without limitation, combinational logic gates (e.g., AND, OR, and NOT), latches, look-up tables (LUTs), registers, programmable switch, or interconnect networks. In some embodiments, configurable storage elements can include flip-flops, block RAM components, among other memory elements.

In some embodiments, a non-transitory non-volatile storage medium stores configuration data used to configure one or more integrated circuits to execute a method for suppressing malicious transmissions on a CAN bus, such as each of methods 400, 500, and 600 of FIGS. 4, 5, and 6, respectively. For example, the one or more integrated circuits can be an FPGA, and the configuration data can be a bit file or bit stream used by the FPGA to configure its configurable logic elements and configurable memory elements to execute a method for suppressing malicious transmissions on a CAN bus, such as each of methods 400, 500, and 600 of FIGS. 4, 5, and 6, respectively. In some embodiments, the non-transitory non-volatile storage medium can include, but is not limited to, read-only memories (ROMs), EPROMs, EEPROMs, programmable resistive links, Ferro RAM, or flash memory such as NOR flash, NAND flash, or vertical NAND.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

What is claimed is:

1. A method to suppress malicious transmissions by overriding frames on a Controller Area Network (CAN) bus, comprising:
   determining when a frame arrives at a CAN bus;
   receiving, from the CAN bus, an arbitration identification (ID) of the frame;
   determining whether to override the frame based on the arbitration ID;
   in response to determining to override the frame, transmitting a predetermined sequence of bits on the CAN bus during transmission of a data length code (DLC) field of the frame to override the frame without triggering an error on the CAN bus;
   generating a message that completes and validates the overridden frame based on the predetermined sequence of bits; and
   transmitting the message on the CAN bus to complete transmission of the overridden frame.

2. The method of claim 1, wherein the predetermined sequence of bits comprises a predetermined number of consecutive dominant bits.

3. The method of claim 1, wherein determining whether to override the frame comprises:
   determining whether to override the frame before receiving a cyclic redundancy check (CRC) of the frame.

4. The method of claim 1, wherein determining whether to override the frame comprises:
   determining whether a plurality of IDs comprises the arbitration ID.

5. The method of claim 4, wherein determining whether to override the frame comprises:
   receiving a plurality of statuses of a vehicle; and
   determining whether to override the frame based on whether the plurality of statuses matches a plurality of criteria.

6. The method of claim 1, wherein generating the message comprises:
   calculating a CRC that validates the frame, and wherein the message includes the CRC.

7. The method of claim 1, wherein transmitting the predetermined sequence of bits on the CAN bus comprises:
   tracking a field of the frame to be transmitted on the CAN bus; and
   determining that the field is the DLC field.

8. The method of claim 1, wherein transmitting the predetermined sequence of bits comprises:
   retrieving the predetermined sequence of bits from a memory.

9. The method of claim 8, comprising:
   receiving a DLC of a second frame related to the frame before receiving the frame;
   in response to determining to override the second frame, determining whether the DLC includes a recessive bit;
   in response to determining that the DLC includes the recessive bit, generating a new DLC having the recessive bit flipped to a dominant bit; and
   storing the new DLC in the memory.

10. The method of claim 1, wherein generating the message comprises:
    retrieving a pre-stored message associated with the arbitration ID and the predetermined sequence of bits.

11. A system to suppress malicious transmissions by overriding frames on a Controller Area Network (CAN) bus, comprising:
    one or more integrated circuits configured to:
      determine when a frame arrives at a CAN bus;
      receive, from the CAN bus, an arbitration identification (ID) of the frame;
      determine whether to override the frame based on the arbitration ID;
      in response to determining to override the frame, transmitting a predetermined sequence of bits on the CAN bus during transmission of a data length code (DLC) field of the frame to override the frame without triggering an error on the CAN bus;
      generate a message that completes and validates the overridden frame based on the predetermined sequence of; and
      transmit the message on the CAN bus to complete transmission of the overridden frame.

12. The system of claim 11, wherein the predetermined sequence of bits comprises a predetermined number of consecutive dominant bits.

13. The system of claim 11, wherein to determine whether to override the frame, the one or more integrated circuits are configured to:
    determine whether to override the frame before receiving a cyclic redundancy check (CRC) of the frame.

14. The system of claim 11, wherein to determine whether to override the frame, the one or more integrated circuits are configured to:
    determine whether a plurality of IDs comprises the arbitration ID.

15. The system of claim 14, wherein to determine whether to override the frame, the one or more integrated circuits are configured to:
    receive a plurality of statuses of a vehicle; and
    determine whether to override the frame based on whether the plurality of statuses matches a plurality of criteria.

16. The system of claim 11, wherein to generate the message, the one or more integrated circuits are configured to:
    calculate a cyclic redundancy check (CRC) that validates the frame, and wherein the message includes the CRC.

17. The system of claim 11, wherein to transmit the predetermined value on the CAN bus, the one or more integrated circuits are configured to:
    track a field of the frame to be transmitted on the CAN bus; and
    determine that the field is the DLC field.

18. The system of claim 11, wherein to transmit the predetermined value, the one or more integrated circuits are configured to:
    retrieve the predetermined sequence of bits from a memory.

19. The system of claim 18, wherein the one or more integrated circuits are configured to:
    receive a DLC of a second frame related to the frame before receiving the frame;

in response to determining to override the second frame, determine whether the DLC includes a recessive bit;

in response to determining that the DLC includes the recessive bit, generate a new DLC having the recessive bit flipped to a dominant bit; and store the new DLC in the memory.

20. The system of claim 11, wherein the system is implemented in an Electronic Control Unit (ECU) coupled to the CAN bus.

21. The system of claim 11, wherein the one or more integrated circuits comprise a field-programmable gate array (FPGA).

* * * * *